(12) United States Patent
White et al.

(10) Patent No.: US 9,933,624 B1
(45) Date of Patent: Apr. 3, 2018

(54) SYSTEM AND METHOD FOR PROVIDING INDIVIDUALIZED VIRTUAL REALITY FOR AN AMUSEMENT ATTRACTION

(71) Applicants: Daryl White, Colleyville, TX (US); Peter R. Schnabel, Victoria (CA); Christopher David Glen Robertson, Victoria (CA); Joanne Parker Robertson, Victoria (CA)

(72) Inventors: Daryl White, Colleyville, TX (US); Peter R. Schnabel, Victoria (CA); Christopher David Glen Robertson, Victoria (CA); Joanne Parker Robertson, Victoria (CA)

( * ) Notice: Subject to any disclaimer, the term of this patent is extended or adjusted under 35 U.S.C. 154(b) by 0 days.

(21) Appl. No.: 15/083,257

(22) Filed: Mar. 28, 2016

Related U.S. Application Data

(63) Continuation-in-part of application No. 15/057,141, filed on Mar. 1, 2016, now Pat. No. 9,778,467.

(51) Int. Cl.
| | |
|---|---|
| *A63G 31/16* | (2006.01) |
| *G02B 27/01* | (2006.01) |
| *G06T 19/00* | (2011.01) |
| *G09G 5/00* | (2006.01) |
| *A63G 31/02* | (2006.01) |
| *G02B 27/00* | (2006.01) |

(52) U.S. Cl.
CPC ......... *G02B 27/0176* (2013.01); *A63G 31/02* (2013.01); *A63G 31/16* (2013.01); *G02B 27/0172* (2013.01); *G06T 19/006* (2013.01); *G09G 5/003* (2013.01); *G02B 2027/0138* (2013.01); *G02B 2027/0159* (2013.01)

(58) Field of Classification Search
CPC ........ A63G 31/00; A63G 31/16; G02B 27/00; G02B 27/01; G02B 27/017; G02B 2027/0178; G01C 23/00
USPC ............ 472/59–61, 130; 434/29, 43, 44, 55; 345/7–8, 419
See application file for complete search history.

(56) References Cited

U.S. PATENT DOCUMENTS

| | | | | |
|---|---|---|---|---|
| 4,048,653 | A * | 9/1977 | Spooner ............... | G02B 27/017 345/156 |
| 5,490,784 | A * | 2/1996 | Carmein ............... | A63B 22/02 434/29 |
| 6,798,493 | B2 * | 9/2004 | Imanishi ............... | B82Y 10/00 355/55 |
| 8,241,038 | B2 * | 8/2012 | Quinn ..................... | G09B 9/00 348/121 |

* cited by examiner

*Primary Examiner* — Kien Nguyen
(74) *Attorney, Agent, or Firm* — Damon R. Hickman Law Firm P.C.

(57) ABSTRACT

A system for providing virtual reality imagery to a rider of an amusement attraction, the system having a headgear piece for securing a viewing screen to a head of the rider. The rider rides upon an actuated motion base that moves the viewing screen behind the user until a lap bar is secured over the user's lap.

6 Claims, 20 Drawing Sheets

SYSTEM AND METHOD FOR PROVIDING INDIVIDUALIZED VIRTUAL REALITY FOR AN AMUSEMENT ATTRACTION

This application is a continuation-in-part of U.S. patent application Ser. No. 15/057,141 filed 1 Mar. 2016, titled "Head Mounted Display;" which is hereby incorporated by reference for all purposes as if fully set forth herein.

BACKGROUND

1. Field of the Invention

The present invention relates generally to virtual reality amusement attractions, and more specifically to a system and method for providing individualized virtual reality to amusement park guests comprising a guest worn headset.

2. Description of Related Art

Various amusement attractions have been developed using Virtual Reality (VR) technology allowing patrons to view and interact with a virtual environment. Typical systems in existence are comprised of a VR headgear system and a motion base. Typical VR headgear uses a screen permanently housed within an enclosure worn by a guest. The enclosure typically includes soft materials that are difficult to properly sanitize. The enclosure is affixed to the head of the patron by means of an elastic headband or similar measure. This conventional system of attaching the headgear to the patron is functional, however, it is difficult and time consuming to properly clean and sanitize the headgear after one patron has completed the attraction experience and prior to the next patron beginning the attraction experience. This difficulty leads to a decrease in throughput of the attraction. A potential solution to increase throughput is for the park operator to purchase an additional entire set of VR headgear devices. This potential solution leads to increased Cost Per User and overall Cost Of Operation.

Traditional VR amusement attractions feature cumbersome headsets that are fitted while the user is in the ride. Unfortunately the cost of operation is higher with traditional head mounted VR systems because of the down time to the ride from cleaning the headsets and from the time to attach the headsets to the users's heads. While there are many systems for virtual reality headsets well known in the art, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
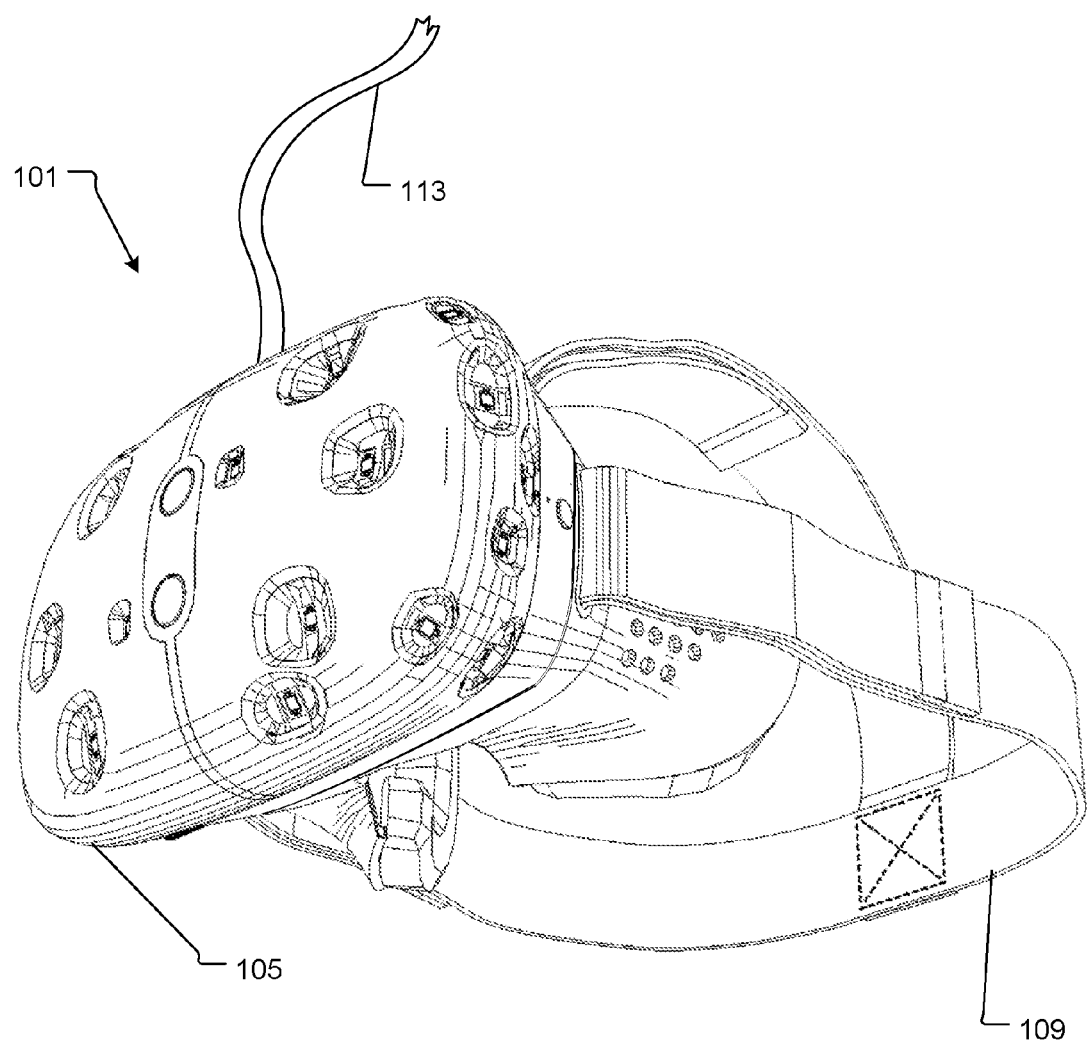
FIG. 1 is a perspective view of a virtual reality headgear device for an amusement attraction illustrated according to the present application.
Figure 2:
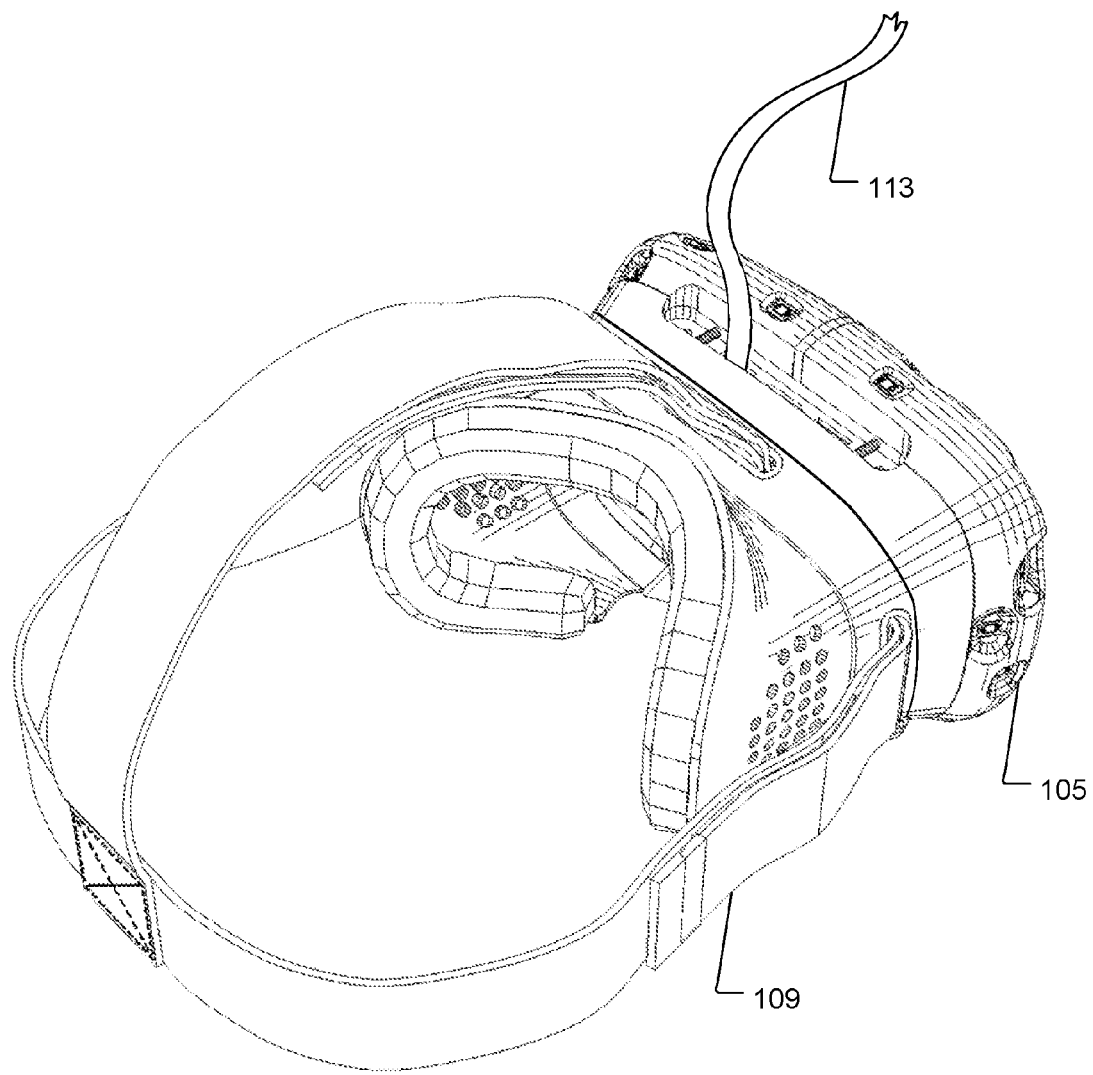
FIG. 2 is a perspective view of a virtual reality headgear device for an amusement attraction illustrated according to the present application.
Figure 3:
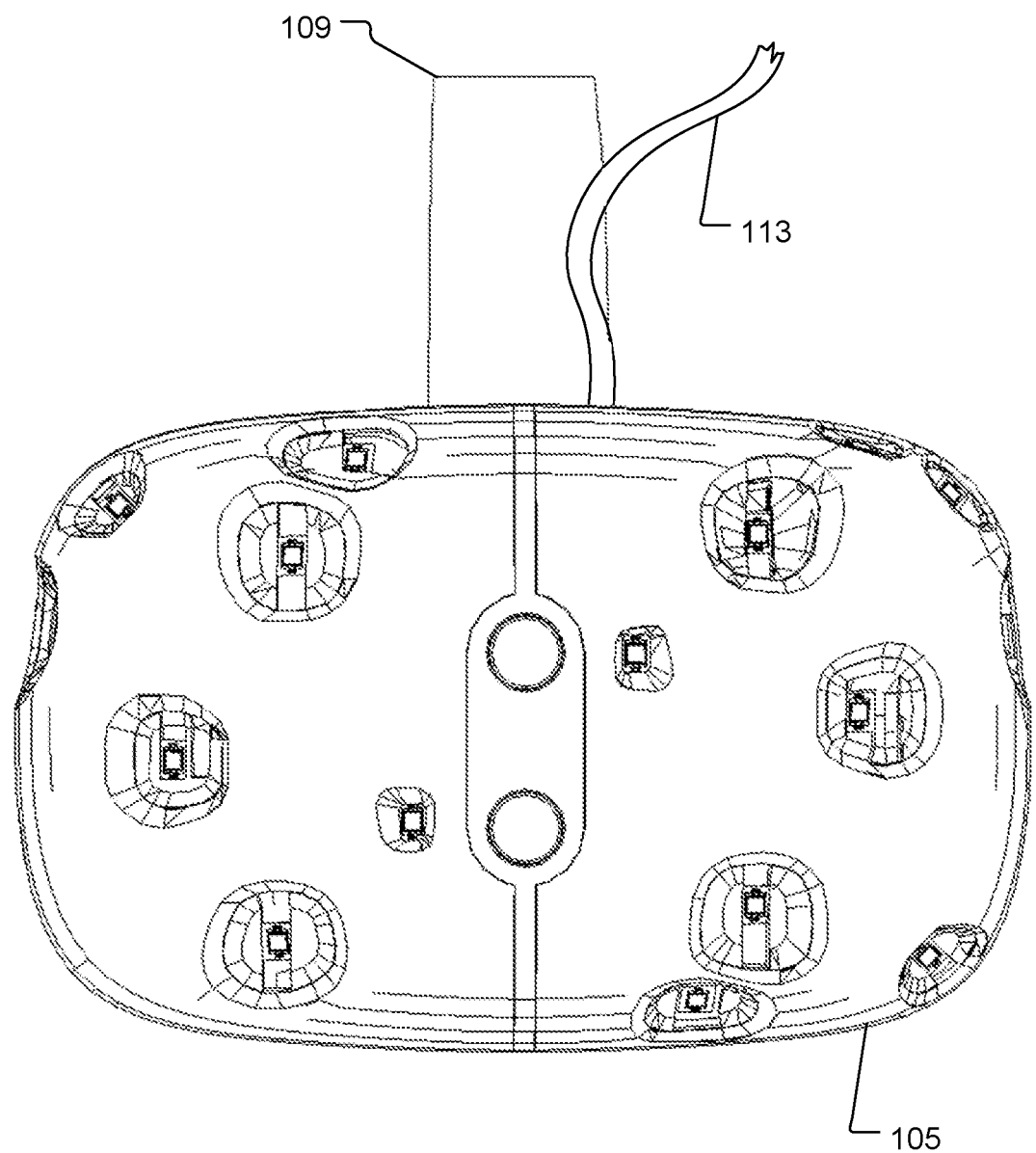
FIG. 3 is a front view of a virtual reality headgear device for an amusement attraction illustrated according to the present application.
Figure 4:
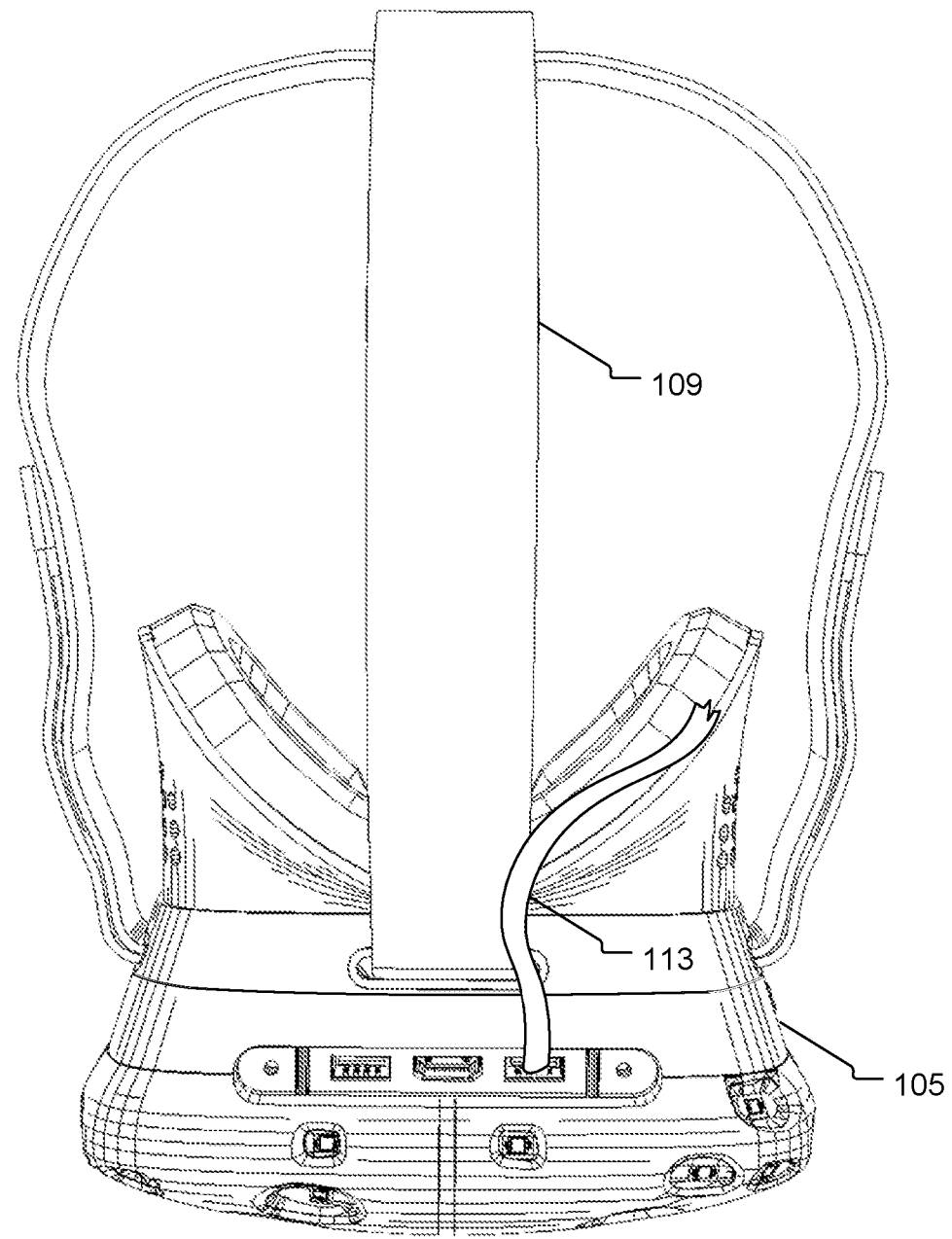
FIG. 4 is a top view of a virtual reality headgear device for an amusement attraction illustrated according to the present application.
Figure 5:
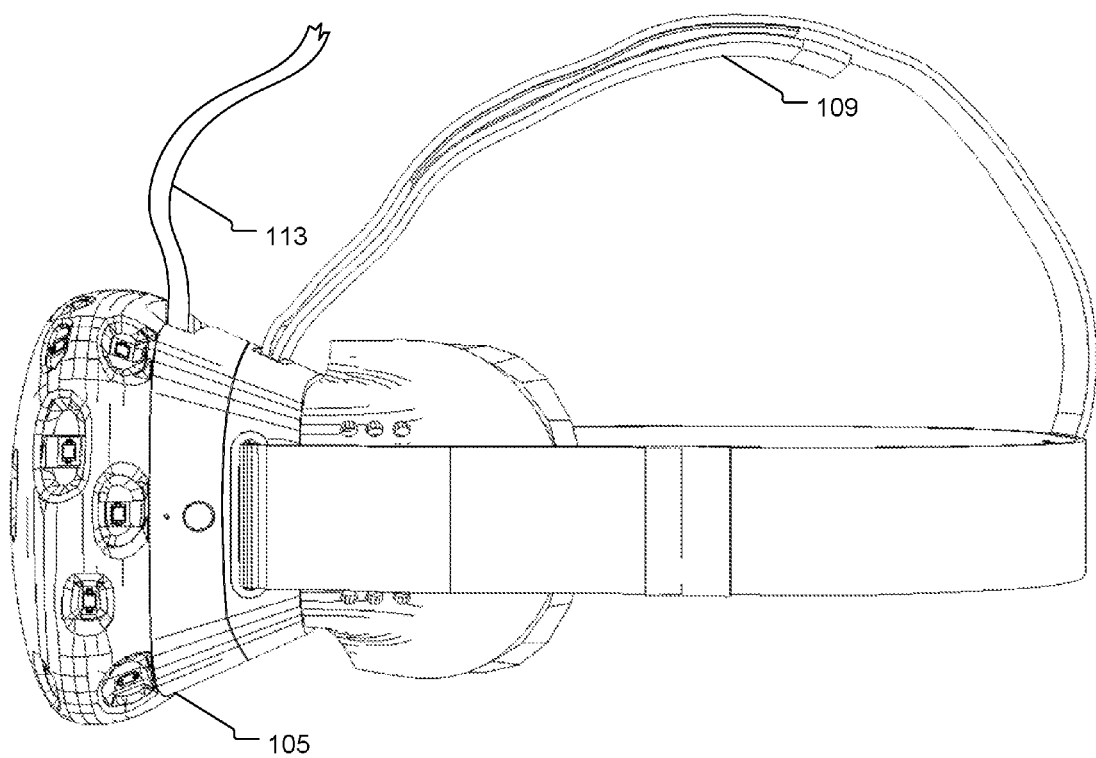
FIG. 5 is a side view of a virtual reality headgear device for an amusement attraction illustrated according to the present application.
Figure 6:
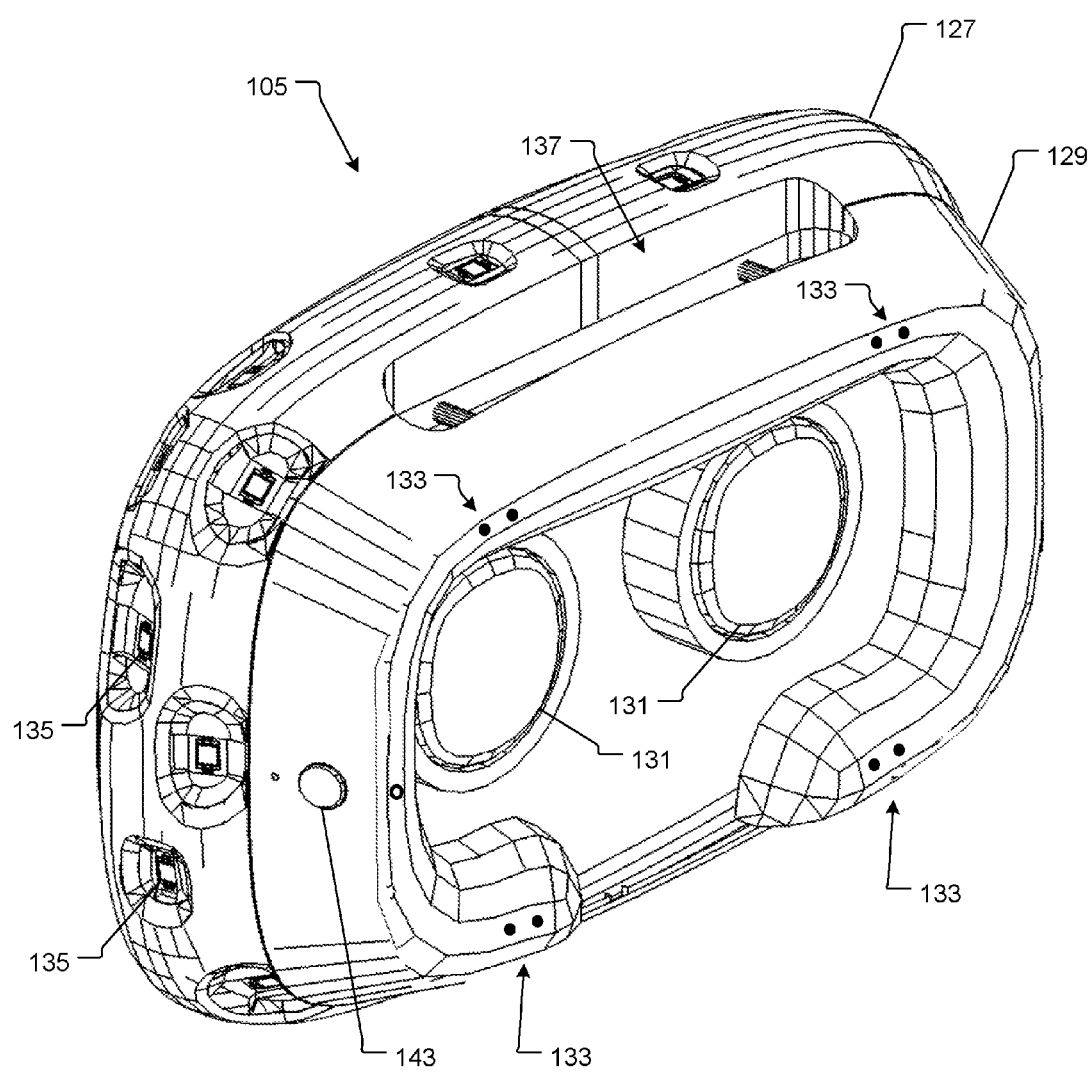
FIG. 6 is a perspective view of a viewing screen for a virtual reality headgear device of an amusement attraction illustrated according to the present application.
Figure 7:
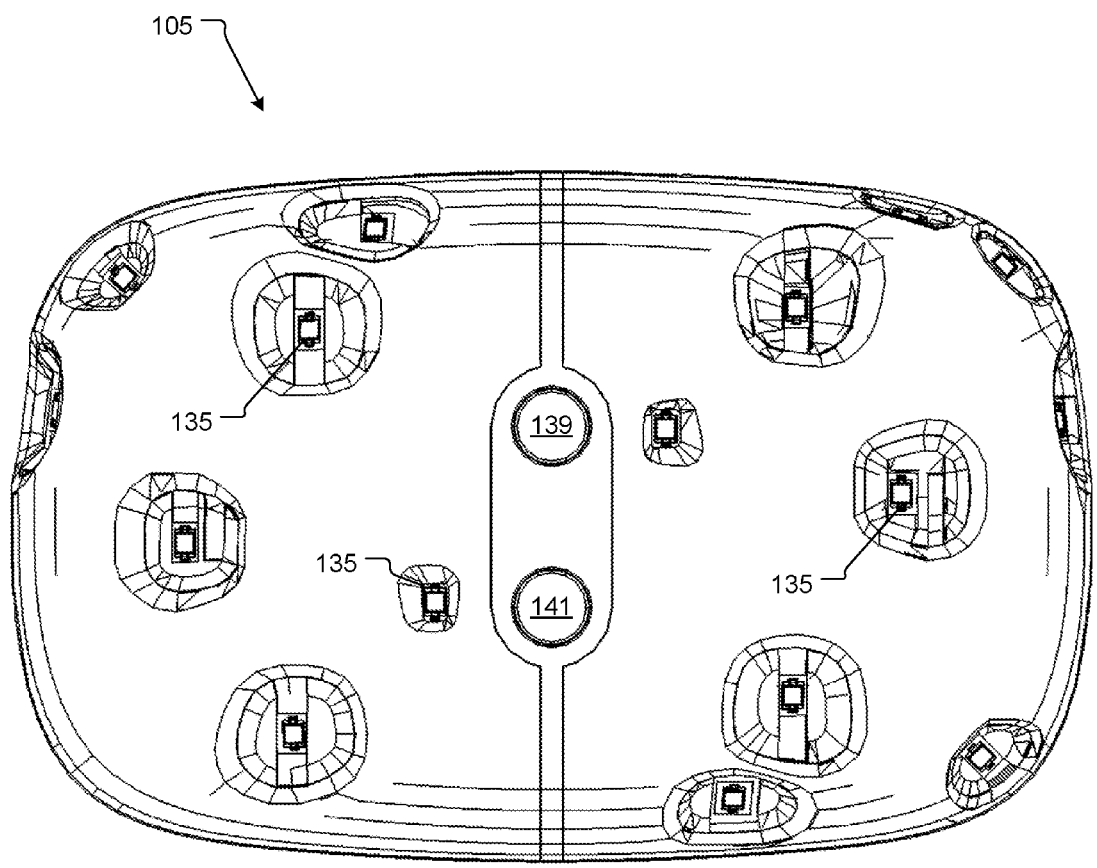
FIG. 7 is a front view of a viewing screen for a virtual reality headgear device of an amusement attraction illustrated according to the present application.
Figure 8:
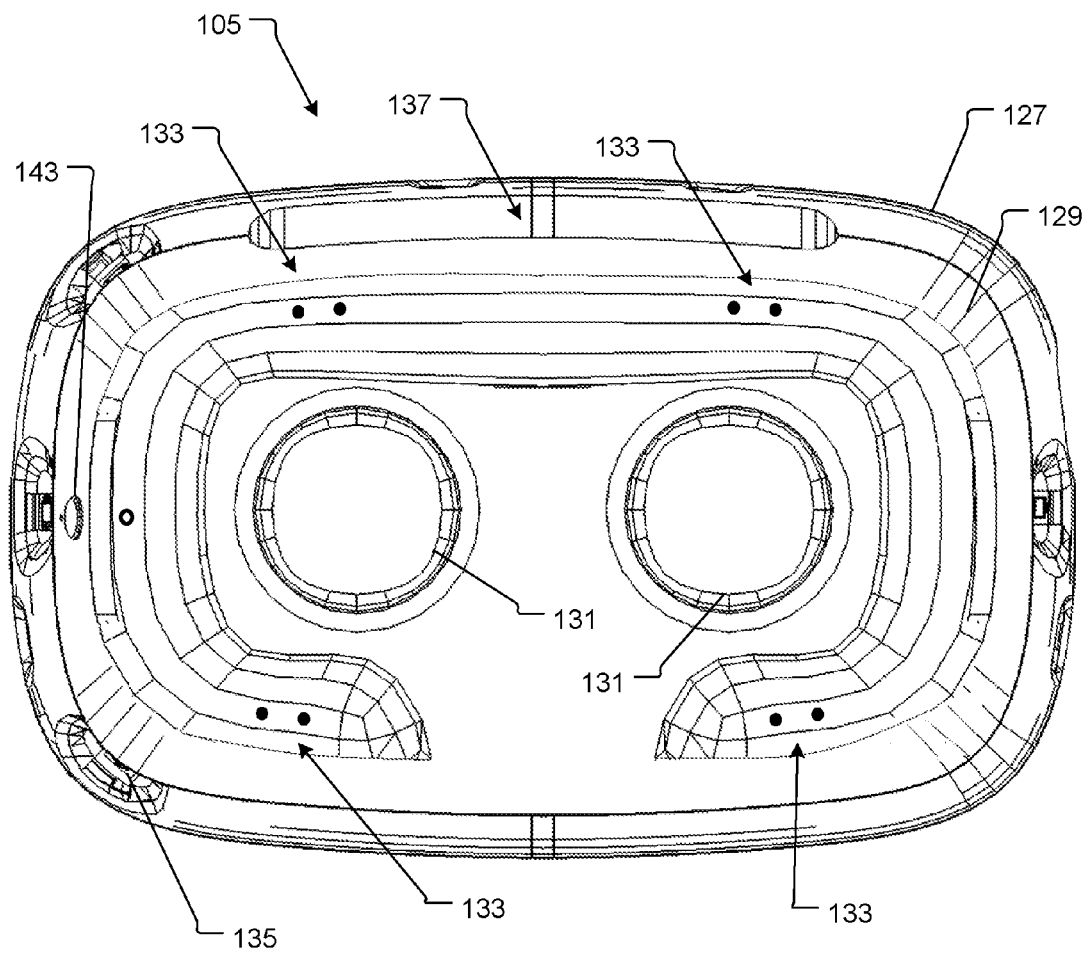
FIG. 8 is a back view of a viewing screen for a virtual reality headgear device of an amusement attraction illustrated according to the present application.
Figure 9:
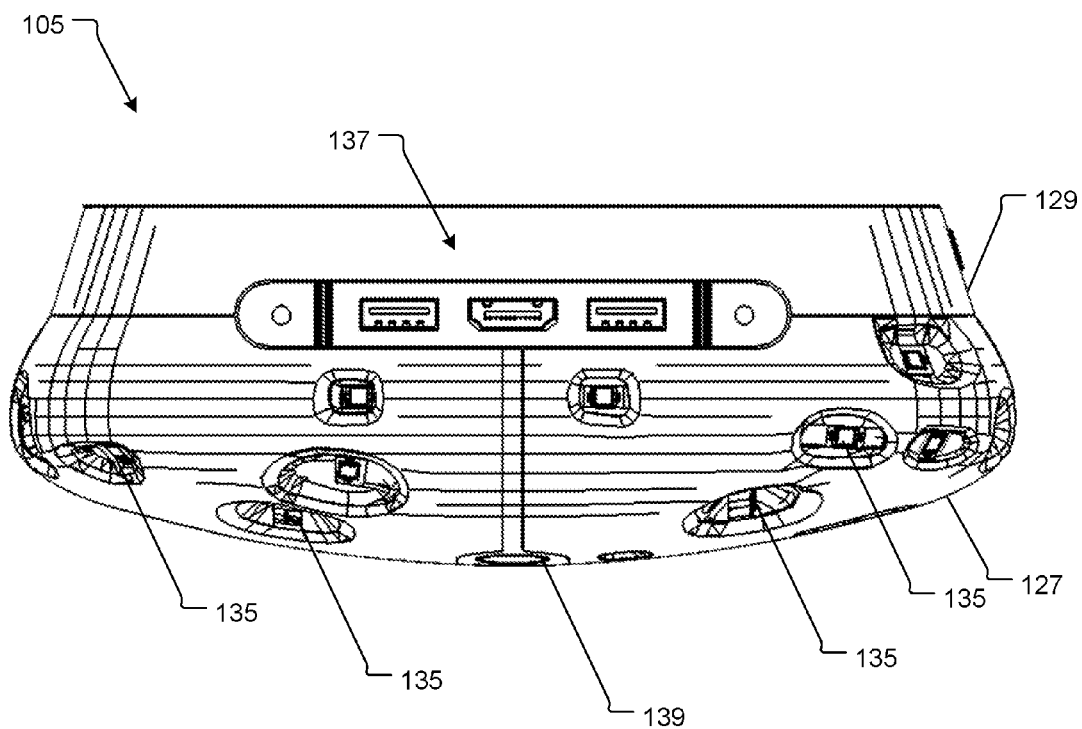
FIG. 9 is a top view of a viewing screen for a virtual reality headgear device of an amusement attraction illustrated according to the present application.
Figure 10:
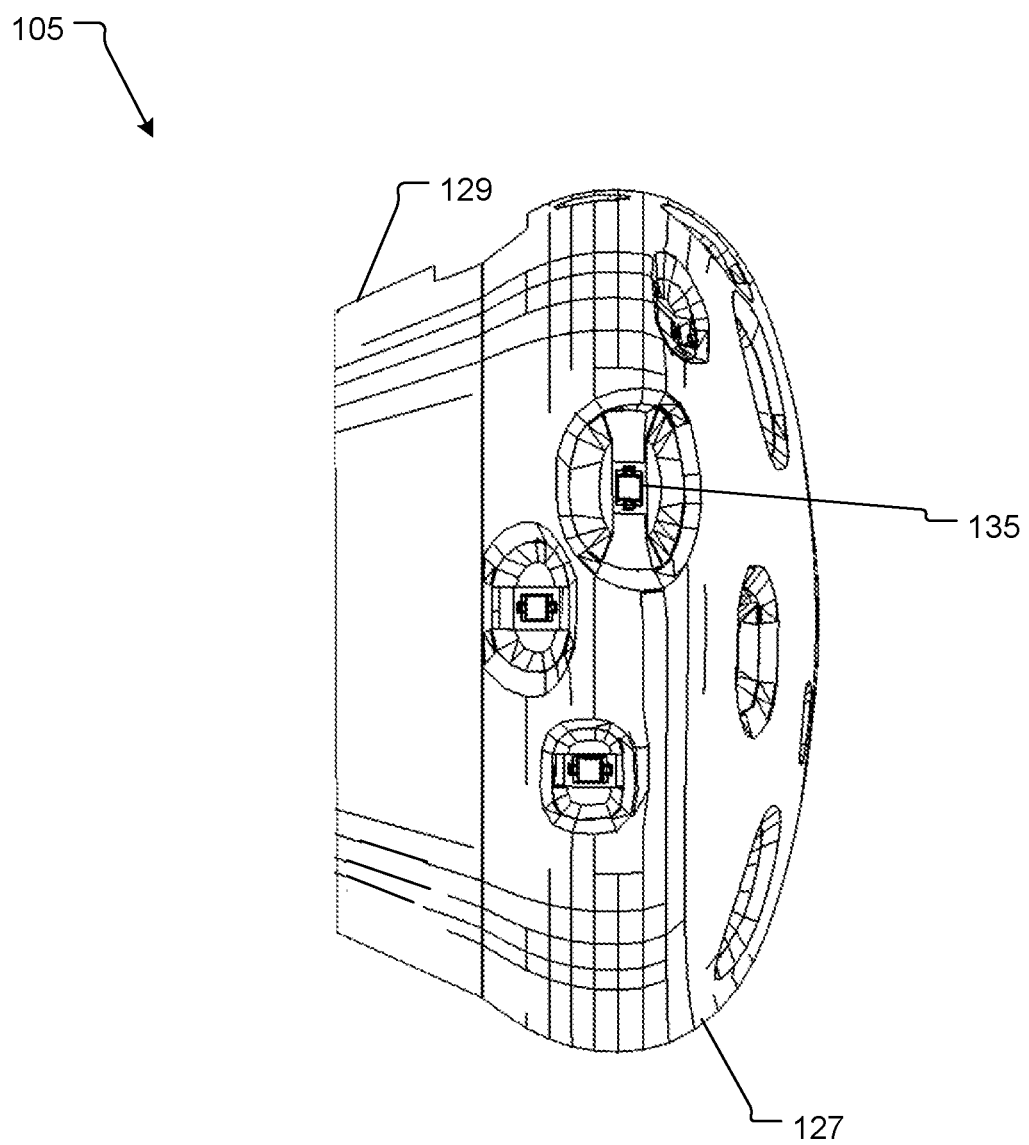
FIG. 10 is a side view of a viewing screen for a virtual reality headgear device of an amusement attraction illustrated according to the present application.
Figure 11:
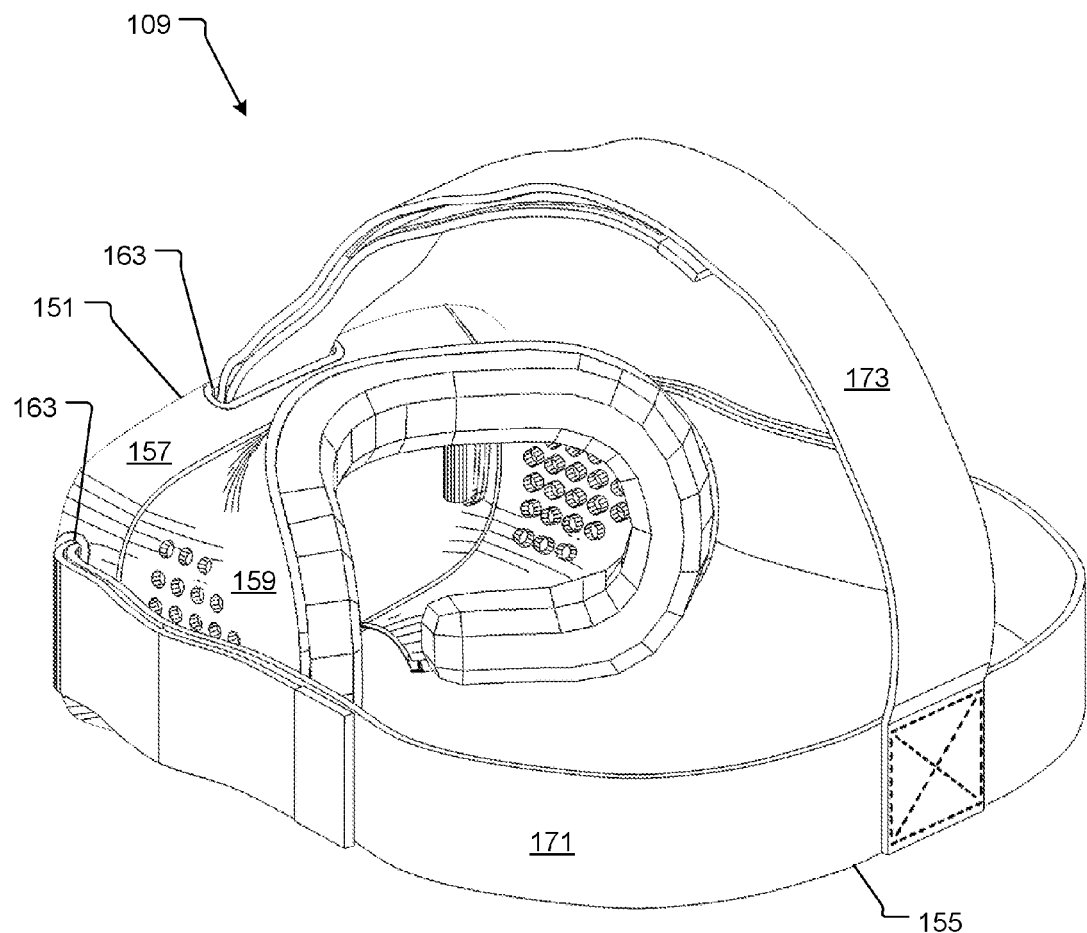
FIG. 11 is a perspective view of a headgear piece for a virtual reality headgear device of an amusement attraction illustrated according to the present application.
Figure 12:
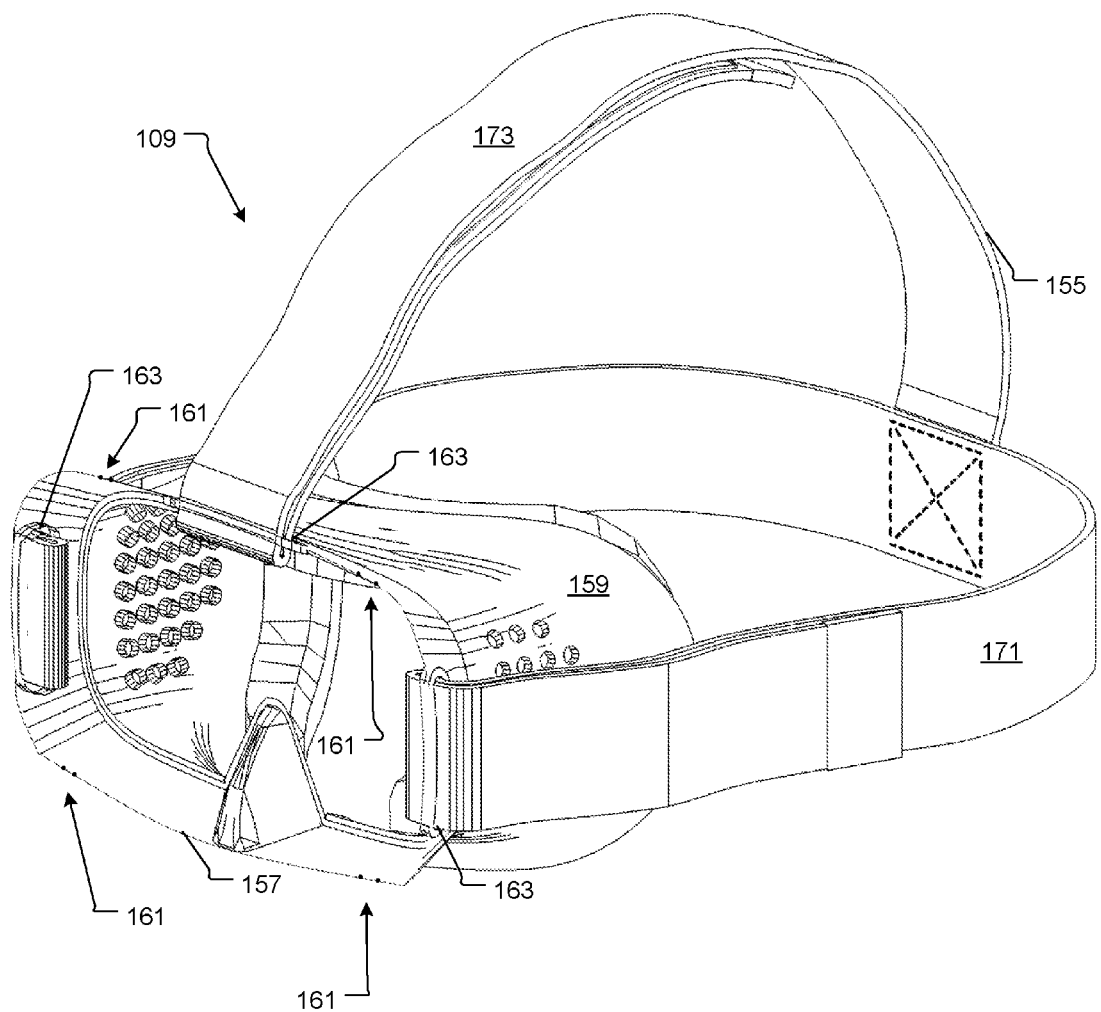
FIG. 12 is a perspective view of a headgear piece for a virtual reality headgear device of an amusement attraction illustrated according to the present application.
Figure 13:
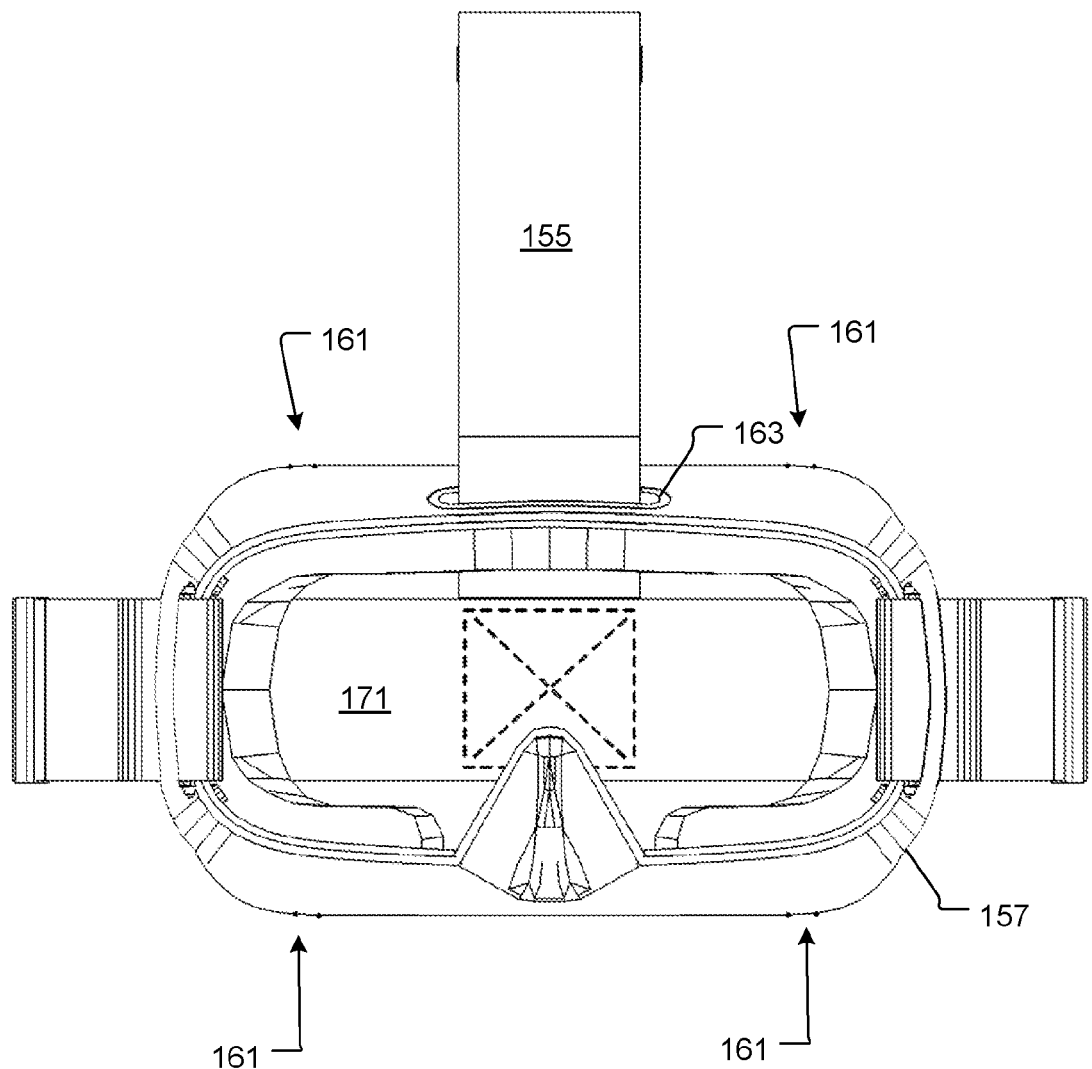
FIG. 13 is a front view of a headgear piece for a virtual reality headgear device of an amusement attraction illustrated according to the present application.
Figure 14:
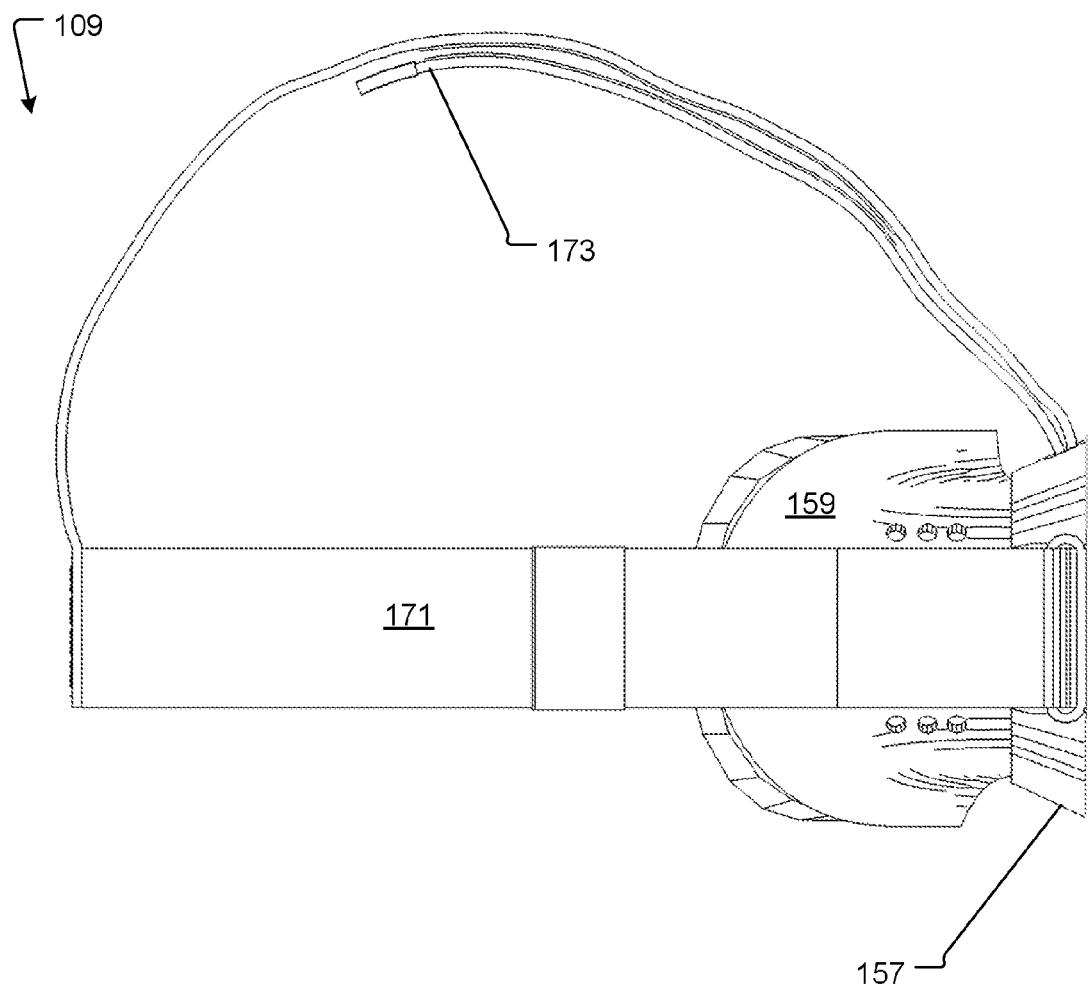
FIG. 14 is a side view of a headgear piece for a virtual reality headgear device of an amusement attraction illustrated according to the present application.

While the assembly of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method for providing individualized virtual reality for an amusement attraction are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The improved decoupleable head mounted display increases the theoretical hourly capacity of an amusement park ride featuring virtual reality provided individually to riders by reducing the time to sanitize the headgear. The time for cleaning and sanitizing head mounted displays can be reduced by configuring the system to allow the display to be removable. Once the display, with sensitive components, has been removed from the headgear, cleaning of the headgear piece can be completed, remotely away from the ride, with processes and chemicals not possible if the electronic viewing portion was still attached. Additionally, the cost of the headgear piece is minor as compared to the display.

Referring now to FIGS. 1-5 in the drawings, views of an improved head mounted display illustrated according to the present application. Head mounted display 101 is comprised of a viewing screen 105 coupled to a headgear piece 109. Viewing screen 105 is preferably coupled to the headgear piece 109 by magnets. Viewing screen 105 is alternatively coupled to the headgear piece 109 by mechanical fasteners. The physical connection between the viewing screen 105 and the headgear piece 109 is sufficiently strong enough to secure the viewing screen to the headgear piece 109 while the user is wearing the head mounted display 101 while being moved by an articulated motion base.

Viewing screen 105 is tethered back to a point external to the headgear piece typically a rigid part of the virtual reality amusement attraction located on the articulated motion base. Tether 113 is comprised of electrical wiring and a security cable. Tether 113 retains the viewing screen such that the user cannot remove the viewing screen from the ride. Tether 113 also provides power and data communications from a controller to the viewing screen 105. Controller or virtual reality controller provides data to the viewing screen such that the user can see a virtual reality environment. Alternatively the tether 113 merely retains the viewing screen 105 to a stationary mounting location such as the amusement attraction, a vehicle, or a motion base and power and data to the viewing screen is provided separately. Tether 113 can support the viewing screen in a hanging position without additional support. In the embodiment where the tether does not provide power and data, the power is supplied by rechargeable batteries located in the viewing screen and data is supplied wirelessly. Furthermore, headgear piece 109 may comprise batteries to power the viewing screen 105.

Referring now to FIGS. 6-10 in the drawings, views of a display portion of an improved head mounted display illustrated according to the present application. Viewing screen 105 or viewing system is comprised of a main portion 127, a closeout portion 129, and at least one screen 131 for displaying images to a user. Preferably viewing screen 105 includes a first screen and a second screen. In the preferred embodiment, each of the first and the second screens displays a different image in order to provide the user a stereoscopic view and appear as a three dimensional image. An alternative embodiment includes displaying the same image on both the first and the second screens for a two-dimensional image presentation to the user. Viewing screens 105 are raised from a flat back surface of the main portion 127. Surrounding the viewing screens 105 is the closeout portion 129. Closeout portion 129 forms a ridge like structure around the viewing screens. When closeout portion 129 is coupled to the headgear piece external light is minimized by the closeout portion.

Closeout portion 129 comprises a system of couplers 133 configured to couple the viewing screen 105 to the headgear piece. Preferably couplers 133 are high strength magnets to removably affix and align the viewing screen to the headgear piece. Magnets are located in pairs around an aft edge of the closeout portion. By locating the magnets around the edge in pairs a strong physical connection between the viewing screen and the headgear piece is created.

Alternatively to the magnets or in addition to the magnets are mechanical fasteners configured to removeably affix and align the view screen 105 to the headgear piece. For example, the viewing screen 105 comprises grooves configured to retain ridges on the headgear piece.

Viewing screen further comprises a head tracking system comprising a plurality of tracking sensors 135 distributed across a forward surface of the main portion 127 of the viewing screen 105, various electrical and mechanical ports 137 to couple the tether to, a first camera 139, and a second camera 141. Tracking sensors are recessed into the forward surface and edges of the main portion 127. Recessing the sensors enables the controller to determine the gaze of the user as some of the tracking sensors 135 will be occluded based upon the position of the viewing screen. While the sensors are shown recessed, alternative embodiments utilize sensors that are not recessed. Some alternative sensors are flush and some protrude from the forward surface of to viewing screen. A light source located proximally to the viewing screen is fixed relative to the motion of the ride and to the motion of the head mounted display preferably in front of the user. The controller knowing the location of the light source can measure positional information by determining which tracking sensors 135 are seeing the light source and which sensors are not seeing the light source. Tracking sensors 135 are preferably light sensitive sensors capable of providing feedback to the controller regarding position, velocity, and acceleration of the headset while worn by a user. Tracking sensors work by measuring light emitted by fixed light emitters located adjacently the motion platform. Additional sensors located in the viewing screen, such as accelerometers and gyroscopes, can provide positional data to the controller in addition to or in replacement of the light trackers.

As many patrons will be in the same area during the ride a plurality of head mounted displays will be utilized concurrently, the system must be able to individually track the head of each patron independently. Mounting the detectors on the headsets reduces the controller's workload in determining the position of each headset. However, other configurations are contemplated by this application. For example, the light detectors can be located at a fixed point adjacent the ride and the light emitters located on the head mounted displays. While optical tracking, with both active and passive markers, of the head mounted display is preferred, additionally and or alternatively inertial tracking is utilized by the system to track the user's head during the ride.

The various electrical and mechanical ports 137 are typically comprised of universal serial bus ports, high definition multimedia interfaces receptacles, mechanical studs, direct current receptacles, and or threaded fasteners. The various electrical and mechanical ports 137 are configured to enable power and data to be delivered and transmitted from the head mounted display and the controller. Additionally the head mounted display can be tethered to a surface to reduce theft and loss. While the ports are preferably located on the top of the head mounted display it should be apparent that other locations on the head mounted display are contemplated.

First camera 139 and second camera 141 provide the controller and the at least one screen 131 with data and imagery from around the user for integration into the virtual reality experience. For example, a rider could view scenery on the at least one screen 131 with a virtual image overlaid to create an augmented reality. Additionally, the first camera 139 and the second camera 141 can provide object tracking data to the controller. For example, as a user raises their hands in front of their head the cameras in conjunction with the controller can determine the position of the user's hands, wrists, and arms. This increases the reality of the amusement attraction as the user's own movements are integrated into the experience without the need for sensors located on the user's hands, wrists, or arms. Furthermore, speakers can be located on the head mounted display to provide individualized auditory information to the riders.

In order to aid the user in breaking the bond between the viewing screen and the headgear piece a release 143 is located on the viewing screen. Release 143, when depressed by a user, forces the viewing screen away from the headgear piece. Release 143 is comprised of a button and rod that translates. Depressing the button pushed the rod which then separates the viewing screen from the headgear piece. Once a magnetic plane has been broken the user can easily pull the viewing screen away from the headgear piece. Alternatively, the release may be remotely controlled by the ride controller so at the end of the ride the screen is popped off the headgear piece with an actuator and pulled up by the tether to be used by the next rider.

Referring now to FIGS. 11-14 in the drawings, views of a mounting portion of an improved head mounted display illustrated according to the present application. Headgear piece 109 is comprised of masking member 151 and strapping system 155. Masking member 151 is comprised of a viewing screen interface member 157, a closeout member 159, and couplers 161. Viewing screen interface member 157 is configured to couple the headgear piece 109 to the viewing screen 105. Viewing screen interface member 157 uses bifurcated openings 163 to couple to the strapping system 155. Closeout member 159 is configured to be in direct contact with the users face around their eyes and is padded. Closeout member 159 typically features a plurality of openings to allow for air to circulate from inside the closeout member. Headgear piece 109 is preferably fabricated from plastic capable of being washed at a high temperature in a commercial grade dishwasher repeatedly without degrading.

Preferably couplers 161 are high strength magnets to removably affix and align the viewing screen to the headgear piece. Magnets are located in pairs around a forward edge of the viewing screen interface member 151. By locating the magnets around the edge in pairs a strong physical connection between the viewing screen and the headgear piece is obtained. Couplers 161 are located and magnetized to couple to couplers 133. For example, the magnets on the viewing screen have a first pole and the magnets on the headgear piece have a second pole not equal to the pole of the viewing screen so the two halves of the head mounted display are rigidly held together. Alternatively to the magnets or in addition to the magnets are mechanical fasteners configured to removeably affix and align the view screen 105 to the headgear piece.

Strapping system 155 is comprised of first strap 171 and a second strap 173. First strap 171 is affixed to the second strap 173 typically by sewing to form the strapping system 155 having three ends. The three ends of the strapping system are wrapped through the bifurcated openings 163 of the viewing screen interface member 151 and secure back to the strapping system with the use of a hook and loop attachment. A length of the first strap 171 and a length of the second strap 173 can be adjusted by the user by adjusting the amount of strap through the bifurcated opening and securing the hook and loop attachments.

Figure 15:
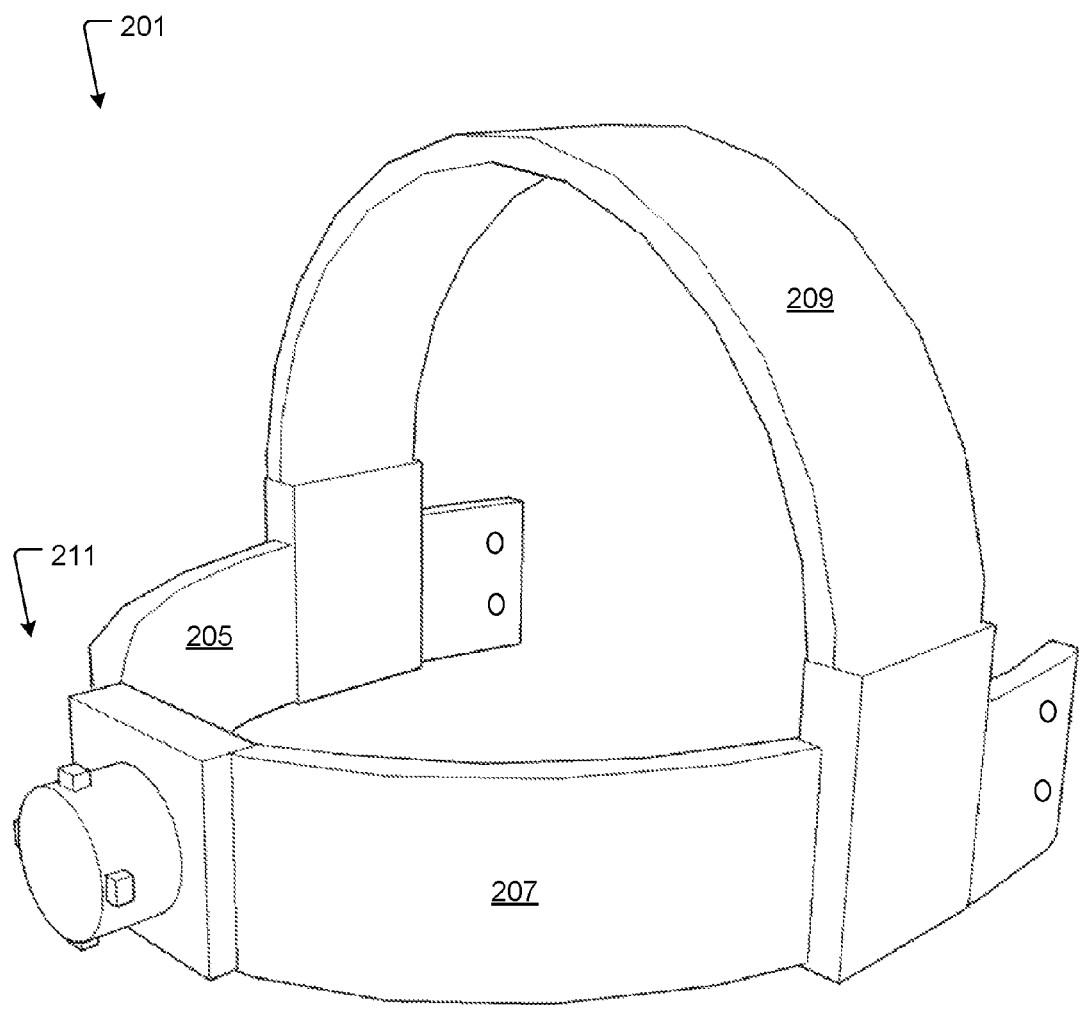
FIG. 15 is a perspective view of an alternative headgear piece for a virtual reality headgear device of an amusement attraction illustrated according to the present application.
Figure 16:
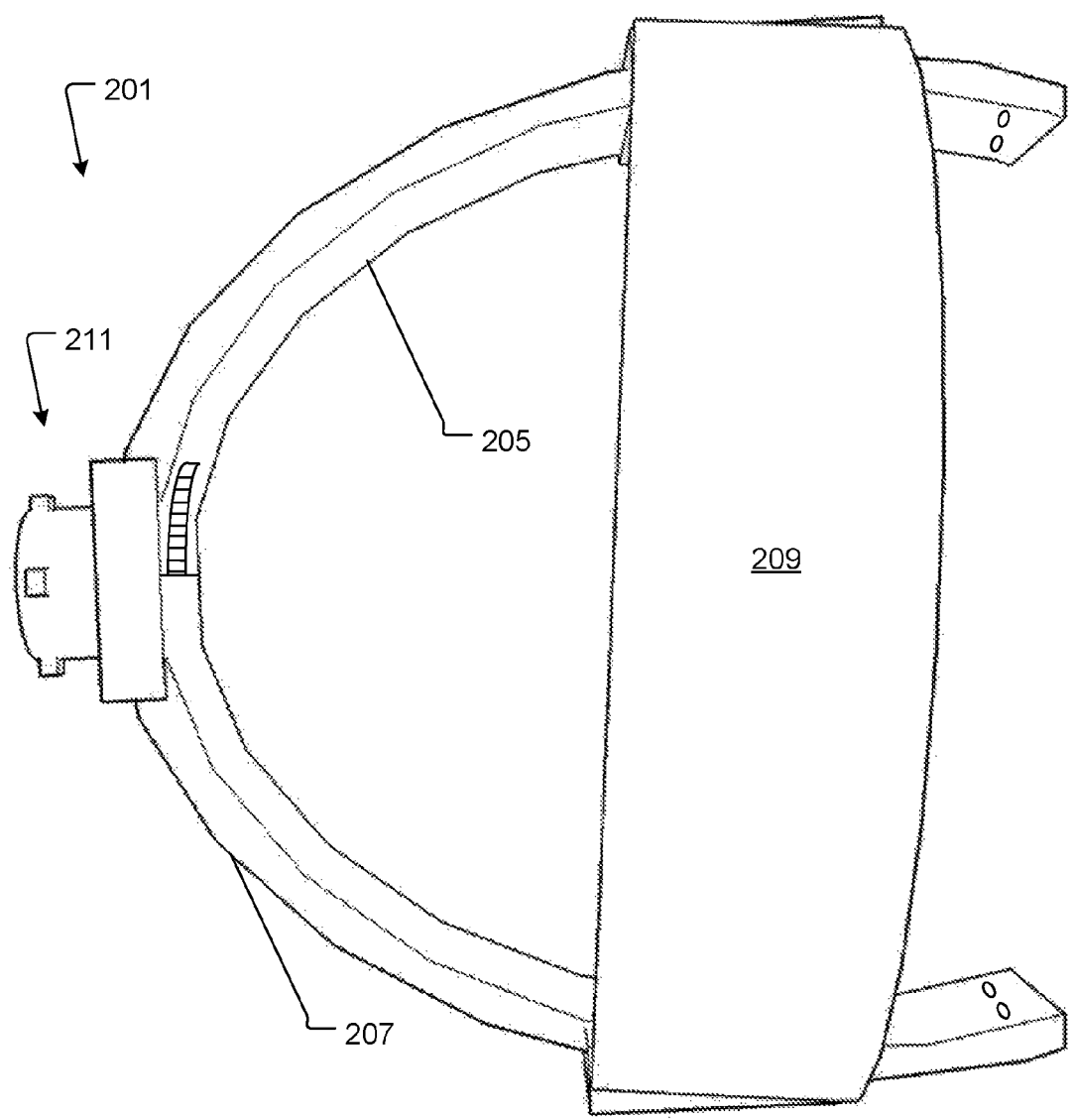
FIG. 16 is a top view of an alternative headgear piece for a virtual reality headgear device of an amusement attraction illustrated according to the present application.
Figure 17:
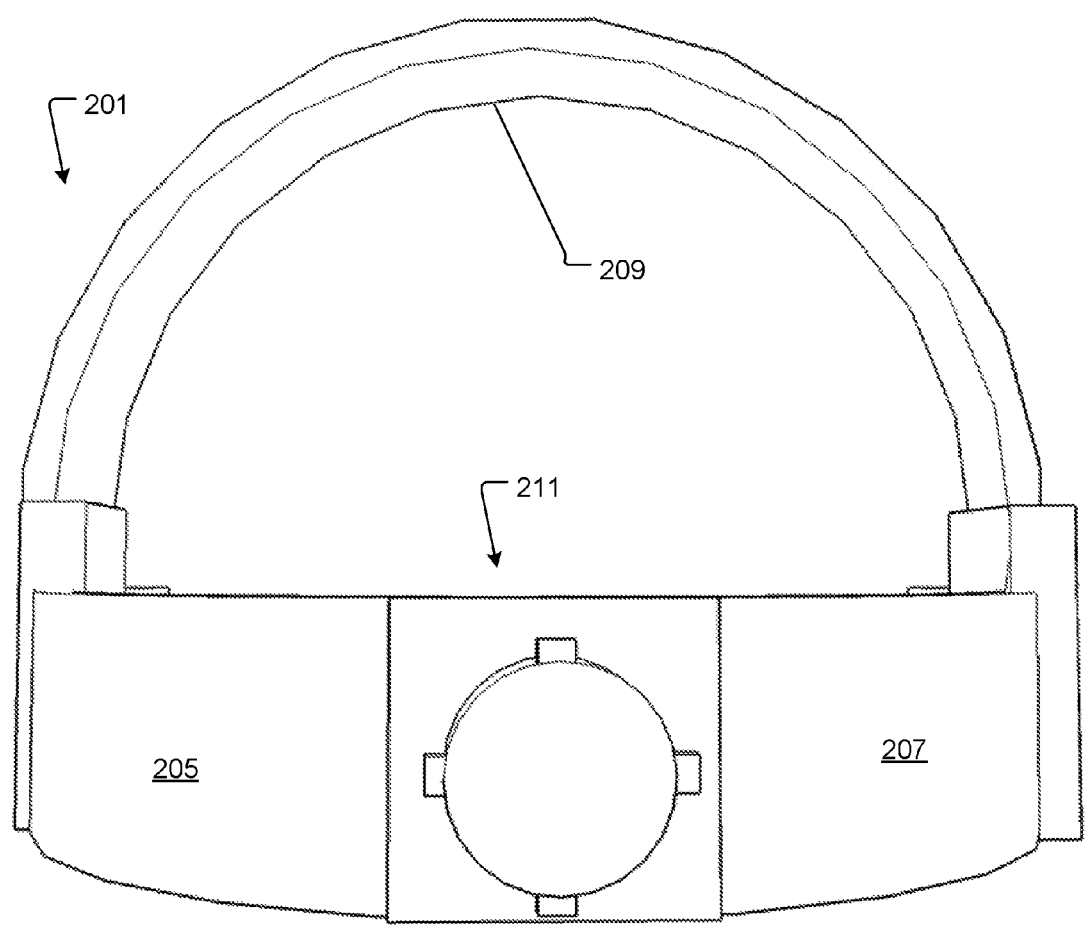
FIG. 17 is a top view of an alternative headgear piece for a virtual reality headgear device of an amusement attraction illustrated according to the present application.
Figure 18A:
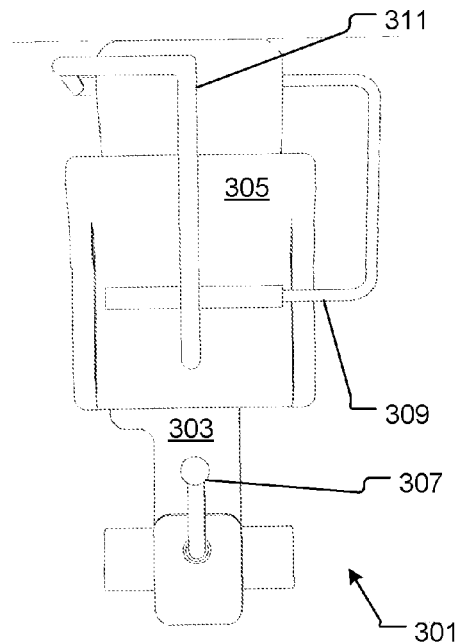
FIG. 18A is a top view of a motion base for a virtual reality amusement attraction illustrated according to the present application.
Figure 18B:
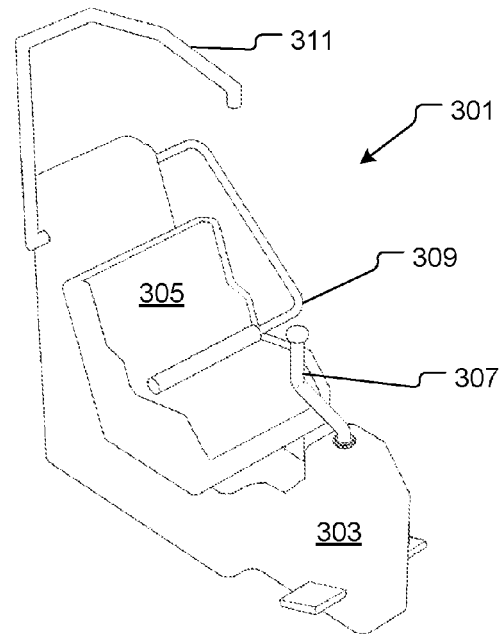
FIG. 18B is a perspective view of a motion base for a virtual reality amusement attraction illustrated according to the present application.
Figure 18C:
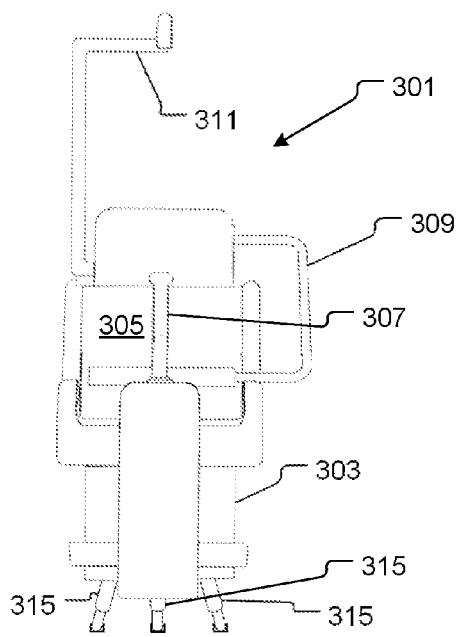
FIG. 18C is a front view of a motion base for a virtual reality amusement attraction illustrated according to the present application.
Figure 18D:
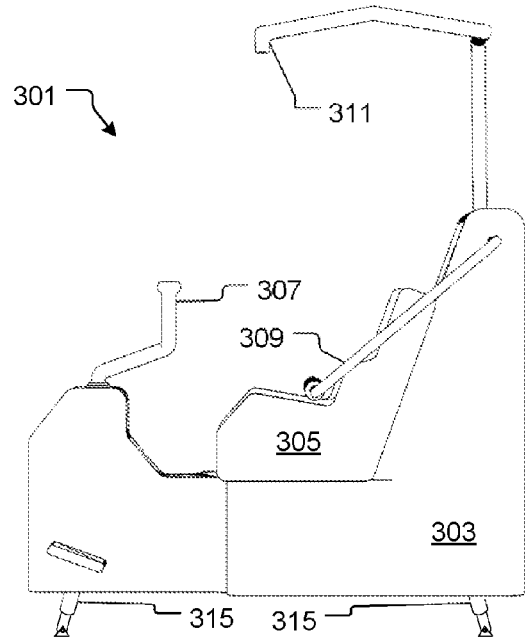
FIG. 18D is a left side view of a motion base for a virtual reality amusement attraction illustrated according to the present application.

Referring now to FIGS. 15-17 in the drawings, views of an alternative mounting portion of an improved head mounted display illustrated according to the present application. Alternative strapping system 201 is comprised of a first horizontal member 205, a second horizontal member 207, a vertical member 209 coupled between the first horizontal member and the second horizontal member, and an adjustment member 211. Adjustment member 211 is comprised of a knob coupled to a ratcheting gear for moving the first horizontal member 205 relative to the second horizontal member 207. The movement allows a user to place the head mounted display with the alternative strapping system 201 onto their head and tighten the strapping system until the display is sufficiently snug to prevent the head mounted display moving relative to the user's head. Once the ride is complete and the user wished to remove the head mounted display tension in the adjustment member 211 is released and the unit can be pulled from the user's head. Alternative strapping system 201 is preferably fabricated from plastic capable of being washed in a commercial grade dishwasher repeatedly without degrading.

Amusement park attractions featuring head mounted display with removable screens allow for operators to provide individualized virtual reality environments to each and every rider. Each rider can have a unique virtual experience as they look around in the virtual environment and are moved corresponding with the virtual environment. The ride comprises a motion base, a tethered head mounted display, a lap bar, display hanger, and a control input. The motion base typically comprises a chair mounted to a plurality of linear actuators for moving the chair in the virtual environment. The display hanger is rotationally attached to the motion base and moves the tethered head mounted display towards and away from the user as needed. The lap bar is rotationally attached to the motion base and prevents riders from leaving the attraction until the ride is over. Additionally, the lap bar is geared to the display hanger such that when the lap bar is located in the user's lap an end of the display hanger is directly over their head. Alternatively, when the lap bar is over their head, the end of the display hanger is located behind the user's head. Control input is a joystick to allow the user to move the motion base and therefor themselves in the virtual environment. Alternatively a front facing camera located on the tethered head mounted display can track the user's hands to provide input into the virtual environment. For example, the user can steer a virtual steering wheel by placing their hands in front of them and rotating them around the virtual steering wheel.

Referring now also to FIGS. 18A-18D in the drawings, views of a virtual reality compatible motion base 301. Motion base 301 is comprised of a base 303, a chair 305 support by the base 303, an input system 307, a restraint system 309, a VR support system 311, and a plurality of actuators 315. The input system 307 is comprised of a motion sensing joystick configured to allow a user to provide input into the virtual reality environment. It should be apparent that chair 305 can be a wheelchair or motorized scooter strapped to a flattened base.

In addition to the joystick or in place of the joystick a controller can track the motion of the user's fingers, hands, wrists, forearms, elbows, and or shoulders to provide input into the virtual reality amusement ride. The controller utilizes a front facing camera, such as camera 139, located on a worn virtual reality headset to track the user's appendages or a camera located adjacent the motion base. The ability to track user's appendages by the system allows for each rider to participate and interact with the virtual reality environment as they ride along. For example, as a user waves their own hands to a virtual partner, the system moves a pair of virtual hands in the virtual environment.

The plurality of actuators 315 preferably is comprised of a first actuator, a second actuator, and a third actuator. While linear actuators are illustrated, it should be apparent that the motion base actuators could have other mechanical outputs such as rotary actuators and oscillatory actuators. The actuators are spaced apart in a tripod configuration wherein the first actuator is located near a front of the motion base, and the second and third actuators are located near a rear of the motion base The plurality of actuators are configured to move the ride in response to the controller and in response to the input system 307. For example, the controller moves the motion base as if the rider was on a boat riding down a series of rapids, the user can select which fork of the river to rider down by moving the input system.

Restraint system 309 is comprised of a lap bar rigidly attached to a C shaped member. VR support system 311 is comprised of an extended member configured to support a virtual reality headset over the user. VR support system 311 further comprises a retraction system to adjust a length of the tether to the display. Both the restraint system 309 and the VR support system 311 pivot about the user. Restraint system 309 is rotationally coupled to the VR support system 311 by a gearing system located in the base. Gearing system preferably has a 2:1 gearing ratio however other ratios are contemplated by this application. The gearing system is geared such that the VR support system rotationally moves half as much as the restraint system. This gearing system allows the restraint system to pivot up and out of the way of the user while moving the VR headset back and away from the user. This allows the user to get into and out of the chair 305 easily and quickly. Certain types of virtual reality embodiments are improved with more realistic restraint systems. The lap bar as illustrated increases throughput of the attraction however other restraint systems are contemplated by this application. For example, restraint system may comprise a five point harness for a system configured as a flight simulator, wherein a portion of the harness is coupled to the gearing system such that securing the harness moves the VR support system closer to the user. Alternatively, the five point harness does not adjust the location of the VR support system. Other types of restraints are contemplated by this application such as seatbelts, over the shoulder restraints, locking lap bars, t bars.

While the VR support system is illustrated as being directly attached to the motion base, it should be apparent that the VR support system alternatively is located remotely to the motion base. For example, the VR support system can be mounted to a wall or ceiling located near the motion base. In this embodiment the display is tethered to structure to prevent removal and provide data and power to the display. In some embodiments the display further comprises a retraction system to move the display close to and away from the user. For example, the hanger is located above the motion base and the system drops the tethered display down near the user's lap. Alternatively, the display is suspended near the user's head, or rests in a basket, until coupled to the headgear piece.

Figure 19:
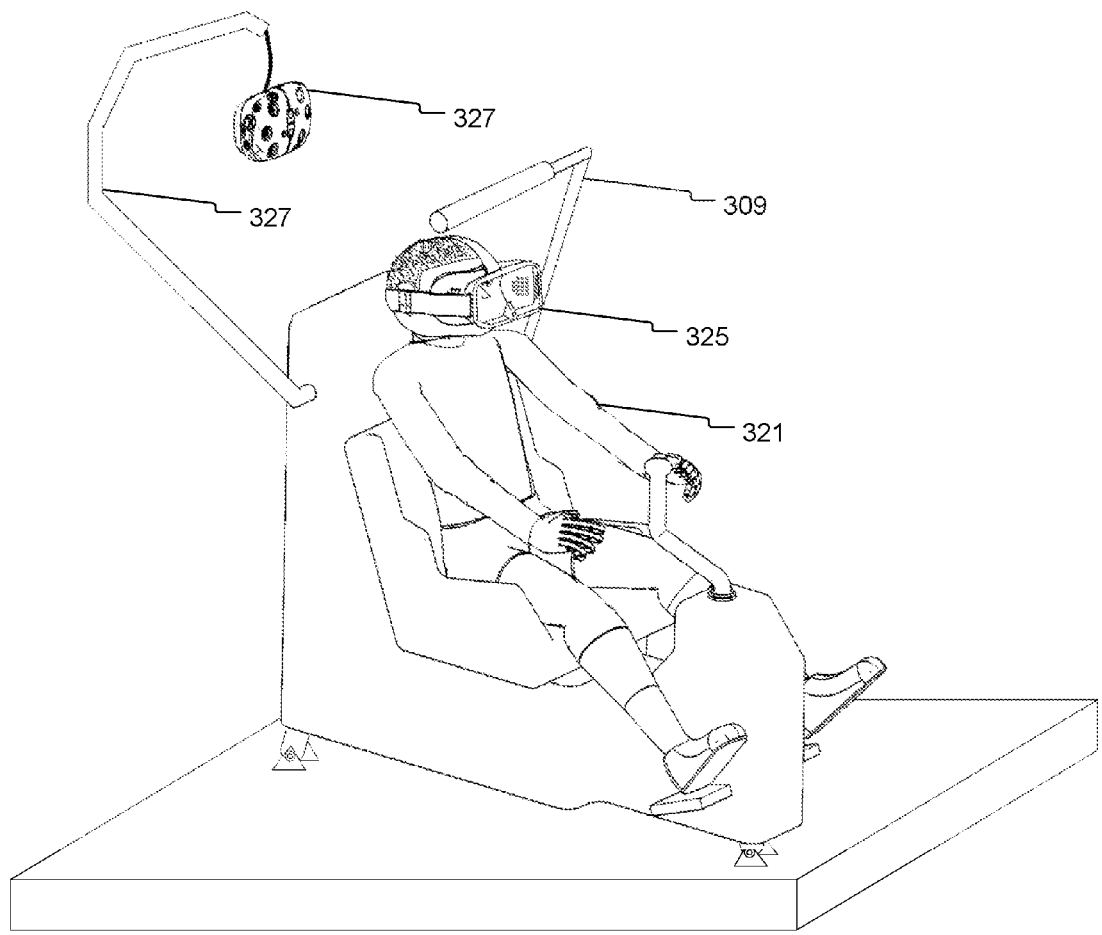
FIG. 19 is a perspective view of a virtual reality amusement attraction with a motion base and head mounted display in an open position illustrated according to the present application.
Figure 20:
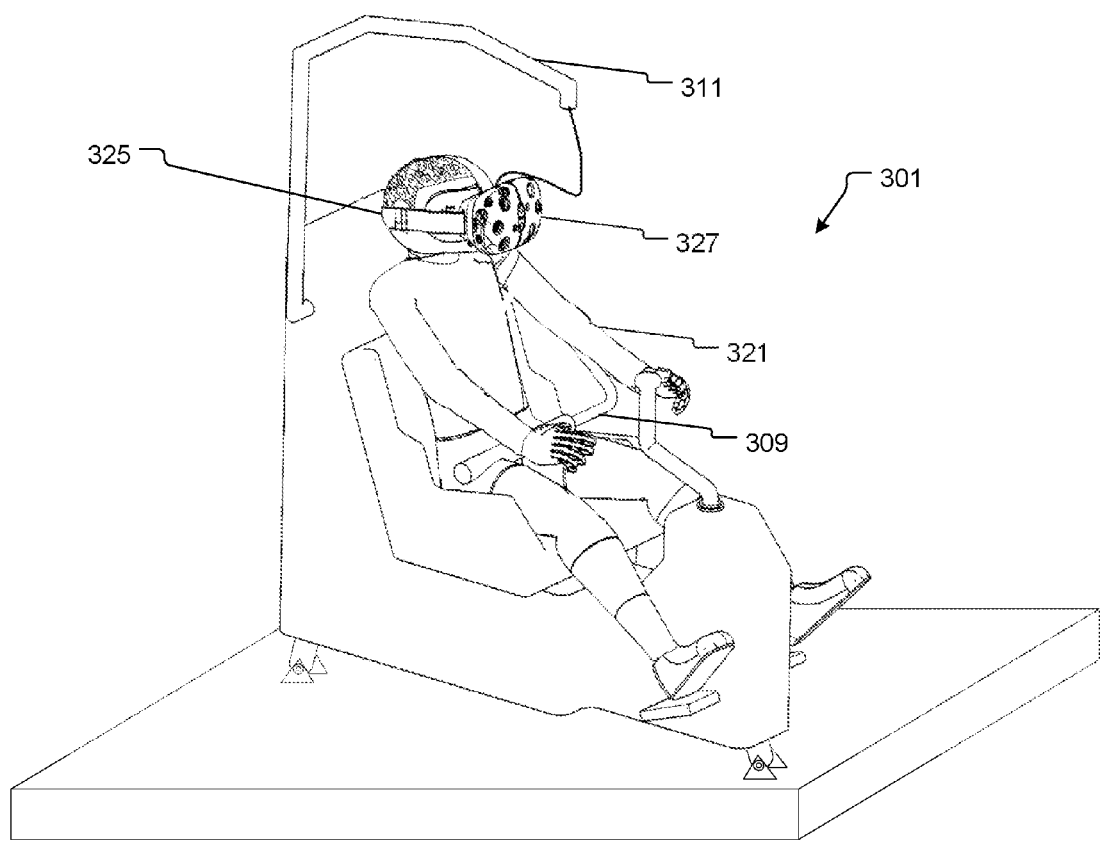
FIG. 20 is a perspective view of a virtual reality amusement attraction with a motion base and head mounted display in a closed position illustrated according to the present application.

Referring now also to FIGS. 19 & 20 in the drawings, views of a virtual reality compatible motion base 301. FIG. 19 illustrates an open or subsequent position of the motion base. Open position is configured for allowing a user 321 to enter and exit the chair. The user is entirely supported by the base as the user sits in the chair 305 and places their feet on the footrests. User is wearing a headgear piece 325, similar to headgear piece 109, around their face and head. User straddles the input system 307. In the open position the VR support system locates a viewing screen 327, similar to viewing screen 105, over and behind the user's head. Viewing screen 327 is tethered to and retained by VR support system 311. Also in the open position the restraint system 309 is located above the user's head. As a user pulls down on the restraint system the VR support system rotates down and locates the viewing screen in front of the user's face. The user grabs the viewing screen and couples the viewing screen to the headgear piece to form a VR headset. The system is configured such that the end of the hanger moves from in front of and above the user in an initial position to above and behind the initial position in a subsequent position. The system moves the hanging display from a location proximate the user's head to a location further away. Moving the display between locations or positions provides easy access to the motion base without users hitting their heads and damaging the displays. While the proximate location illustrated is in front of the user's head it should be apparent that the proximate location may be on the side of the user's head or just above the user's head. The non-proximate location is any location where the user can enter the motion base freely without interference from the display.

FIG. 20 illustrates the closed or initial position of the motion base. The restraint system 309 is locked in the user's lap and prevents the user from exiting the ride. Furthermore, the viewing screen as tethered by the VR support system is located in a position in front of the user's face so that the viewing screen can be coupled to the headgear piece. Once the ride is over the process is reversed. The viewing screen is decoupled by the user. Next the restraint system is released by an operator. The user then pulls up on the restraint system and the VR support system pivots behind the user. Once the user exits the ride they can recycle the headgear piece to be washed and reused.

While the system described above is configured for an amusement attraction, it should be apparent that the system alternatively can be configured for a gaming system and or a flight simulator. Both military and civilian use of the system provides virtual reality providers with quicker turnaround and higher usage of the equipment than conventional virtual reality systems. Additionally, the system comprising a two piece virtual reality headset and motion base is configurable for locations where groups of users are exposed to virtual reality environments, such as in Amusement Parks, Theme Parks, Carnivals, Exhibitions, Tours, Traveling Exhibitions, Orientation Centers, State Fairs, County Fairs, Local Fairs, Church Fairs, Museums, FEC's, Driving Simulators, and Flying Simulators.

The system provides operators of virtual reality amusement park attractions with quicker throughput. Users are issued headgear piece while they are waiting to board the motion bases. Users are able to adjust the fit and position of the headgear pieces before they board the motion bases. Viewing screens require less cleaning as they are not in direct contact with the user.

It is apparent that an assembly and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An amusement attraction, comprising;
   a display;
   a headgear piece; and
   a motion base, comprising;
      a hanger, configured to support the display over a head of a rider;
   wherein the display is removeably attached to the headgear piece
   wherein the display is tethered to the hanger.

2. The amusement attraction according to claim 1, the motion base further comprising:
   a restraint system.

3. The amusement attraction according to claim 1, the motion base further comprising:
   a control input; and
   a plurality of actuators.

4. An amusement attraction for displaying a virtual reality environment, comprising:
   a virtual reality controller;
   a virtual reality display;
   a headgear piece; configured to releaseably retain the virtual reality display; and
   a motion base, comprising;
      a lap bar;
      a control input;
      a plurality of actuators; and
      a hanger rotationally coupled to the lap bar;
   wherein an end of the hanger is configured to move from in front of and above the user in an initial position to above and behind the initial position in a subsequent position.

5. The amusement attraction for displaying a virtual reality environment according to claim 4, wherein the virtual reality display is retractably tethered to the end of the hanger.

6. The amusement attraction for displaying a virtual reality environment according to claim 4, further comprising:
   a battery system located on the virtual reality display;
   wherein the virtual reality display is wirelessly connected to the virtual reality controller.

* * * * *